Oct. 31, 1933.  H. M. STAINFIELD  1,933,080

MACHINE FOR BROACHING

Original Filed Sept. 18, 1926   7 Sheets-Sheet 2

Oct. 31, 1933.  H. M. STAINFIELD  1,933,080
MACHINE FOR BROACHING
Original Filed Sept. 18, 1926   7 Sheets-Sheet 3

Inventor
Harry M. Stainfield
By
Attorney

Oct. 31, 1933.  H. M. STAINFIELD  1,933,080
MACHINE FOR BROACHING
Original Filed Sept. 18, 1926   7 Sheets-Sheet 6

Inventor
Harry M. Stainfield,
By
Attorney

Patented Oct. 31, 1933

1,933,080

UNITED STATES PATENT OFFICE 1,933,080

MACHINE FOR BROACHING

Harry M. Stainfield, Cleveland, Ohio

Application September 18, 1926, Serial No. 136,253. Renewed February 27, 1933

7 Claims. (Cl. 90—33)

This invention relates to a machine for effecting broaching operations on bodies or blanks of varying shapes and sizes.

One object of the invention is to provide a machine of this character that may be readily adapted to broaching the walls or surfaces of bodies or blanks, the walls of openings extending therethrough or the walls of slots formed in the bodies or blanks.

Another object of the invention is to provide a machine of this character that is relatively simple in construction, but permits of large output.

Another object of the invention is to construct an improved machine of this character wherein the broaching tool or tools may be readily mounted and removed.

A further object of the invention is to provide an improved sectional broach or broaching tool so constructed and correlated that repeated resharpening thereof may be carried out without the continuity of its broaching edges.

A further object of the invention is to provide an improved sectional broach or broaching tool, whereby the same can be made of any desired length and the sections can be re-sharpened for continued and repeated use.

Another object of the invention is to provide an improved broaching machine wherein the broaching tool is stationary and an endless carrier moves the blanks to be broached relative to the tool.

Another object of the invention is to provide an improved broaching machine wherein, by means of an endless carrier for the blanks, two or more broaching operations upon each blank may be carried out simultaneously.

Other objects of the invention will be apparent to those skilled in the art to which my invention relates from the following description taken in connection with the accompanying drawings, wherein.

Referring to Figs. 1 to 7, inclusive, of the drawings, 1 indicates as an entirety a support preferably comprising a base 1a and spaced side members 1b which may be formed integrally therewith. On the base 1a and between the side members 1b I support an elongated trough or receptacle 2 for holding a quantity of cutting compound, such as lard oil and the like. The side members 1b support a pair of transverse shafts 3, 3a, preferably disposed at the opposite ends thereof, and mounted in suitable bearings 4, one of these shafts (3) being driven by a driving means indicated as an entirety at 5. The shafts 3, 3a, have secured to them pairs of sprocket wheels 6, 6, 7, 7, respectively, on and around which a carrier such as a pair of endless chains 8, 8, run in a well known manner. Each sprocket 6, 6, 7, 7, may be keyed to the adjacent shaft, such connection being desirable between the shaft that is driven and the sprockets thereon and each is adjustably secured to the adjacent shaft by suitable means, such as a set screw 9 fitting and extending through a threaded opening in the hub of the sprocket, to permit of the adjustment of each sprocket endwise of its shaft to space the chains 8, 8, relative to each other and the broaching tool or tools 10, 10, to be later referred to, dependent upon the size and shape of the bodies or blanks to be broached.

Figure 1:
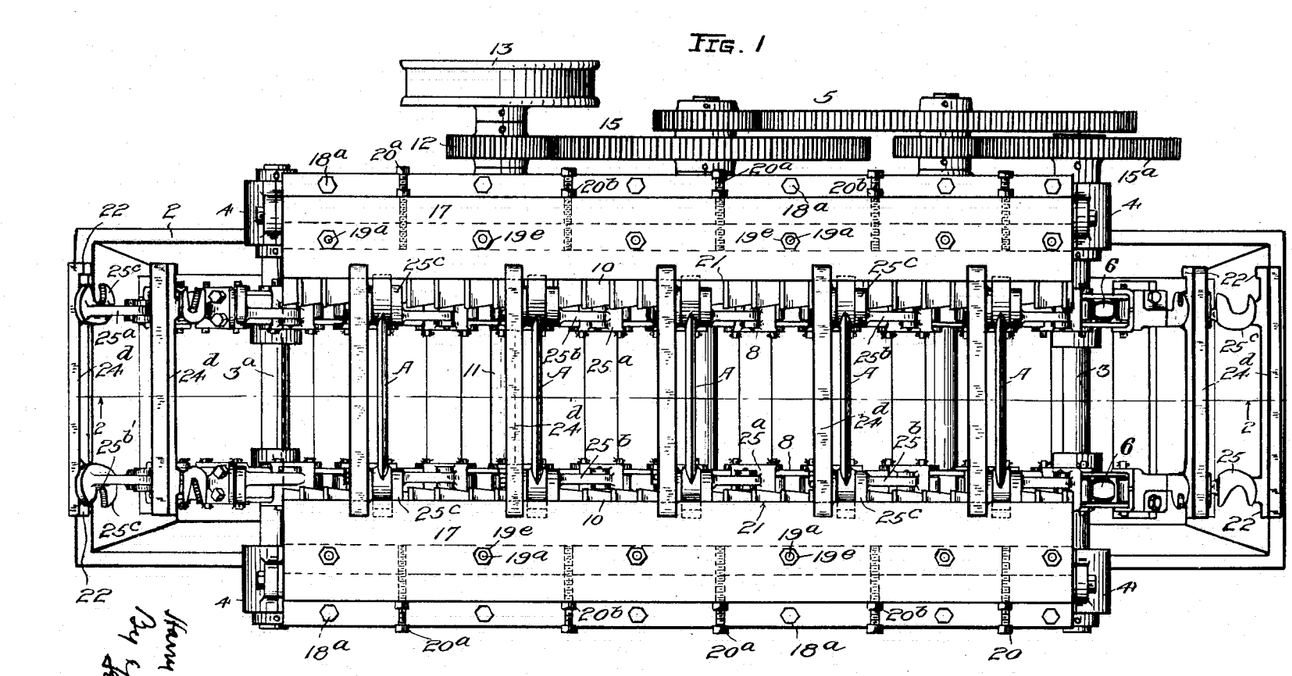
Fig. 1 is a plan view of a machine embodying my invention.

Of the driving means 5, 11 indicates a shaft mounted in suitable bearings in the side members 1b and extending outwardly or laterally beyond one thereof, such extended end carrying a pinion 12 and an element 13 to which power is applied. In the illustrated form of construction, such power element consists of a pulley, around which a belt 14 runs to drive it. The pinion 12 forms one element of a gear train 15 the driven element 15a of which is fixed to the shaft 3, and through the latter and the sprockets 6, 6, thereon serves to drive the chains 8, 8.

Figure 6:
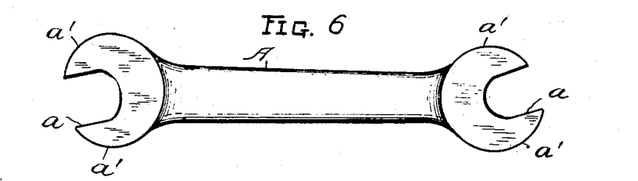
Fig. 6 is a plan view of a body formed with openings at its ends, the walls of which are to be broached; the body herein shown for illustrative purposes consisting of a spanner.
Figure 7:
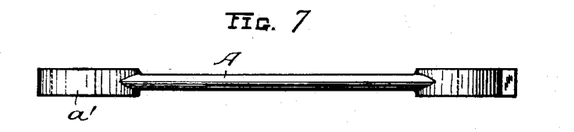
Fig. 7 is a side view of the body shown in Fig. 6.

In the form of construction now being described the broaching tool or tools 10, 10, are held stationary and the work or bodies to be broached are engaged by the chains 8, 8, and moved relative to the tools. This arrangement serves to increase the output by facilitating the positioning of the work and providing for the broaching of a plurality of blanks or bodies simultaneously and also the broaching of each blank at its opposite ends simultaneously, if desired. In one application of my invention, illustrated herein by way of example, it may be used to broach a wrench of the spanner type, such as shown at A in Figs. 6 and 7, wherein openings or notches a are formed in its ends.

The broaching tools 10, 10, are supported on and secured to the upper edges of the side members 1b. In the illustrated form of construction one tool 10 is mounted on each side member, but it will be obvious that either or both side members may carry a plurality of tools. The construction and shape of the securing means will depend upon the form of broaching tool required for the particular construction and shape of the blanks to be broached. Each tool herein shown is adjustably supported and held in position in the following manner: 16 indicates a horizontal support preferably comprising integral flanges extending longitudinally of the upper end of each side member 1b and serving as a base for a casing 17. The casing 17 comprises two members 17a, 17b, extending longitudinally of the support or base 16 and correlated to clamp between them the adjacent tool 10. Each casing 17 is preferably mounted on series of bolts 18, 18a, those of one series extending upwardly through screw-threaded openings formed along the inner portion of the base 16 and engaging the casing at their free ends and those of the other series preferably extending through openings formed in a flange 17c provided along the outer wall of the casing element 17a and engaging the base 16 at their free ends. By adjusting the bolts 18, 18a, it will be seen that the casing 17 may be bodily raised or lowered and also inclined at different angles to position the tool or its broaching edge in proper position to effect broaching of the bodies A as they are carried forwardly by the chains 8. Each of the bolts 18, 18a, may be locked in adjusted position by a nut 18b. The casing 17 is clamped to the base 16 in any desired manner, preferably by devices indicated at 19, which secure the two casing members 17a, 17b, together to clamp the adjacent tool between them and also clamp the casing to the base 16. The devices 19 preferably comprise a plurality of bolts 19a extending through aligned openings 19b, 19c, formed in the casing members 17a, 17b, respectively, and also through elongated slots 19d formed in base 16, the head of each bolt engaging the underside of the base 16 (see Fig. 3) and a nut 19e being mounted on the upper or free end of the bolt and tightened against the casing member 17b. The slots 19d are elongated to permit of adjustment of the casing 17 inwardly and outwardly or toward and from the other casing 17, to adjust the tool carried by it. The casing member 17a is provided along its outer edge with an upstanding wall 17a' which serves as a fulcrum for the outer longitudinal edge of the casing member 17b. As the clamping devices 19 are disposed between the wall 17a' and the adjacent tool, the tightening of these devices operates to press the inner longitudinal edge of the member 17b against the body portion 10a of the tool and hence clamp it between the casing members. To interlock the tool 10 between the casing members and in relatively stationary position, as well as to permit of its adjustment inwardly and outwardly, I provide the body portion 10a of the tool with diverging upper and lower faces and provide similarly disposed faces on the inner walls of the casing members 17a, 17b, such walls cooperating to prevent inward movement of the tool 10. To prevent outward movement of the tool, I provide a series of abutments 20, which may be adjustable, that co-act with the clamping walls or faces to maintain the broaching tool in position. The abutments 20 preferably comprise bolts 20a mounted in screw-threaded openings formed in the wall 17a', the inner or free ends of the bolts engaging the rear wall of the tool (see Fig. 3). The bolts 20a may be locked in adjusted position by nuts 20b. It will be noted that the tools 10 herein shown have a body portion 10a and an edge supporting portion 10b which is disposed at an angle to the body portion according to the angle of the slot walls to be broached and that the tool on one base 16 is disposed opposite to the tool on the other base 16 to correspond to the angle or inclination of the slots a of the work (see Fig. 6). To provide for these arrangements, the walls of the respective casing members 17a, 17b, are thickened, as will be understood from Fig. 3. Along its inner free edge or portion, the casing member 17b is extended, as shown at 21, so that the upper surface of such extended portion may form a guide wall for a shoe 22, which will be later referred to. Either or both of the inner end walls of the casing members 17a, 17b, are preferably shaped to form surfaces shown at 23, 23a, (Fig. 3) that are complements of the walls a', a', of the blank A at either side of either or both slots a. The chains 8, 8, serve to move the blanks relative to the tools 10 and throughout such movement, their end walls a' slidably engage the surfaces 23, 23a, whereby they are maintained in a predetermined relation to the broaching tools 10, 10.

The blanks A are removably supported or mounted on the chains 8 in such manner that they may be guided and maintained in a predetermined relation to the tool independently of the chain so that the flexing and vibration of the latter will not affect the broaching operations. The mounting means for the blanks may be of any desired construction, but preferably comprise pairs of devices 24, 25, carried by certain of the links of the chains 8, the former being disposed on the rear sides of the blanks A and serving to resist the action of the broaching tools as the chains move forwardly and the latter being disposed in front of the blanks and serving to hold them against the supporting devices 24. By mounting the supporting devices 24, 25, on different links of each chain 8, they automatically separate to release the blanks A, as the chains 8 engage the rear sprockets 6 and run around their axes and automatically move toward each other to engage the blanks as the chains leave the sprockets 7 to traverse their upper run. As a result, one operative can conveniently and rapidly position the blanks one after another on the chains, and the separation of the devices permits them to drop by gravity as the devices move around the sprockets 6, into a suitable chute or receptacle (not shown). The supporting devices may be of varying shapes dependent upon the construction of the blank and shape of the broaching tools.

Figure 3:
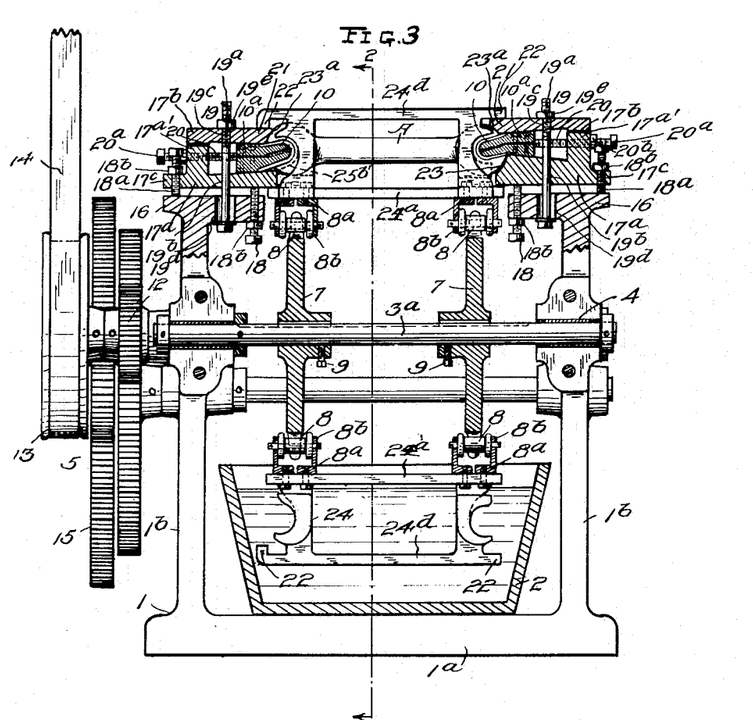
Fig. 3 is a section on the line 3—3 of Fig. 2.
Figure 4:
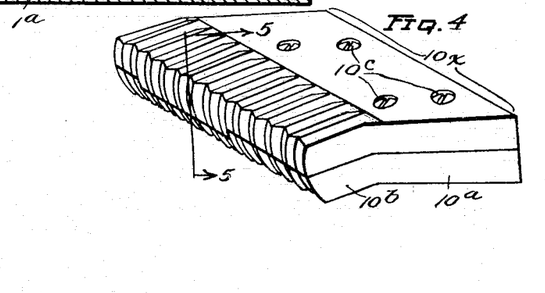
Fig. 4 is a fragmentary perspective view of a section of the broaching tool.
Figure 5:
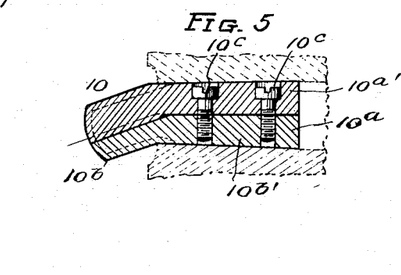
Fig. 5 is a section of the tool on the line 5—5 of Fig. 4.

In the illustrated form of construction, each supporting member 24 comprises the following: 24a indicates a base plate extending between the chains 8, 8, and secured at each end to the inturned members 8a of the side bars 8b of a chain link, each member 8a preferably being formed integral with the adjacent side bar. 24b indicates upstanding bars, preferably disposed in the vertical planes of the chains 8 and provided with faces 24c which engage the blanks A. As shown in Fig. 3, the faces 24c are shaped to extend around the slots a of the blank and thus operate to engage the blank at points relatively close to the surfaces engaged by the broaching tools. 24d indicates a bar or tie member connecting the upper ends of the bars 24b together and carrying at their opposite ends the shoes 22 already referred to. Due to the inclination of the slots a and the shape of the walls a' in which the slots a are formed, one shoe 22 extends laterally for engagement with the guide 21, whereas at the other end of the tie-member 24d, the shoe 22 is provided by bending the free end of the member downwardly. I preferably provide two clamping devices 25 for each blank A, each being pivoted on a base plate 25a formed integrally with the side bars of one of the links of the chain and aligned with the device 25 on the other chain 8. Each device 25 comprises a rearwardly extending arm 25b having a blank engaging wall 25c at its outer end and an enlarged lug 25d on its lower side, serving as a weight to insure the return of the device to blank engaging position as it moves to the upper portion of the sprockets 7. As shown at 25b' in Fig. 3 (see dotted lines), the wall 25c of each device 25 is cut away so as to avoid danger of contact with the tool. By preference, the supporting devices 24, 25, of each pair are separated from each other by one link and the several pairs thereof are separated from each other by one link, thereby providing the maximum number on the chains.

Each of the tools 10 may be of any desired length, but preferably it has a length equal to the travel of the chains along their upper run, so that the broaching operation may be carried on throughout a relatively long travel of the blanks. Each tool 10 comprises upper and lower sections 10a', 10b', correlated to provide teeth or cutting edges on their outer sides and ends, each tooth on one section aligning with a tooth on the other section; furthermore, the sections 10a', 10b', are preferably made up of a plurality of segments 10x disposed in pairs. This arrangement permits the tools to be of varying lengths according to the size of the machine or construction of the blanks without danger of the tools becoming warped or distorted; for example, the tool may be five feet in length and formed of segments each one foot in length; also, as will be understood from Figs. 2, 3, 4 and 5, the pairs of segments may be so constructed that one segment of each pair overlaps the joint between the segments of adjoining pairs; in other words, instead of the meeting edges of the teeth on one pair of segments being in line with the meeting edges of the teeth on adjoining pairs, the meeting edges of the teeth of one pair of segments is off-set relative to the meeting edges of the teeth of both adjoining pairs of segments. By this arrangement, the teeth on one pair of segments overlap the joint between the teeth on the adjoining pairs of segments and thus insure broaching of the blank entirely across the bottom wall of the slot to be broached; otherwise, due to re-sharpening of the teeth, they would become separated along the joint between the segments of each pair and hence leave metal on the blank that should be removed. The segments 10x of each pair may be secured together by countersunk cap screws 10c.

It will be understood that the teeth of the tool vary slightly in size of approximately one and one-half to two thousandths of an inch from end to end thereof. If the tool were made from a single member or upper and lower sections, re-sharpening of its broaching edges would soon make the tool under-size. By making the tool in sections, made up of pairs of segments, each pair of the latter after it has become undersized, may be moved along the tool support the length of a pair of segments, and when it again becomes undersized, it may be again moved along the adjacent support and replace the adjoining pair of segments.

This permits the respective pairs of segments to be progressively moved the length of one pair thereof toward the left (as viewed in Fig. 2) and successively used until each pair becomes reduced in size below the cutting limit at the extreme left hand end of the support. By reason of this construction, a material saving of up-keep results.

Figures 8, 12, 13:
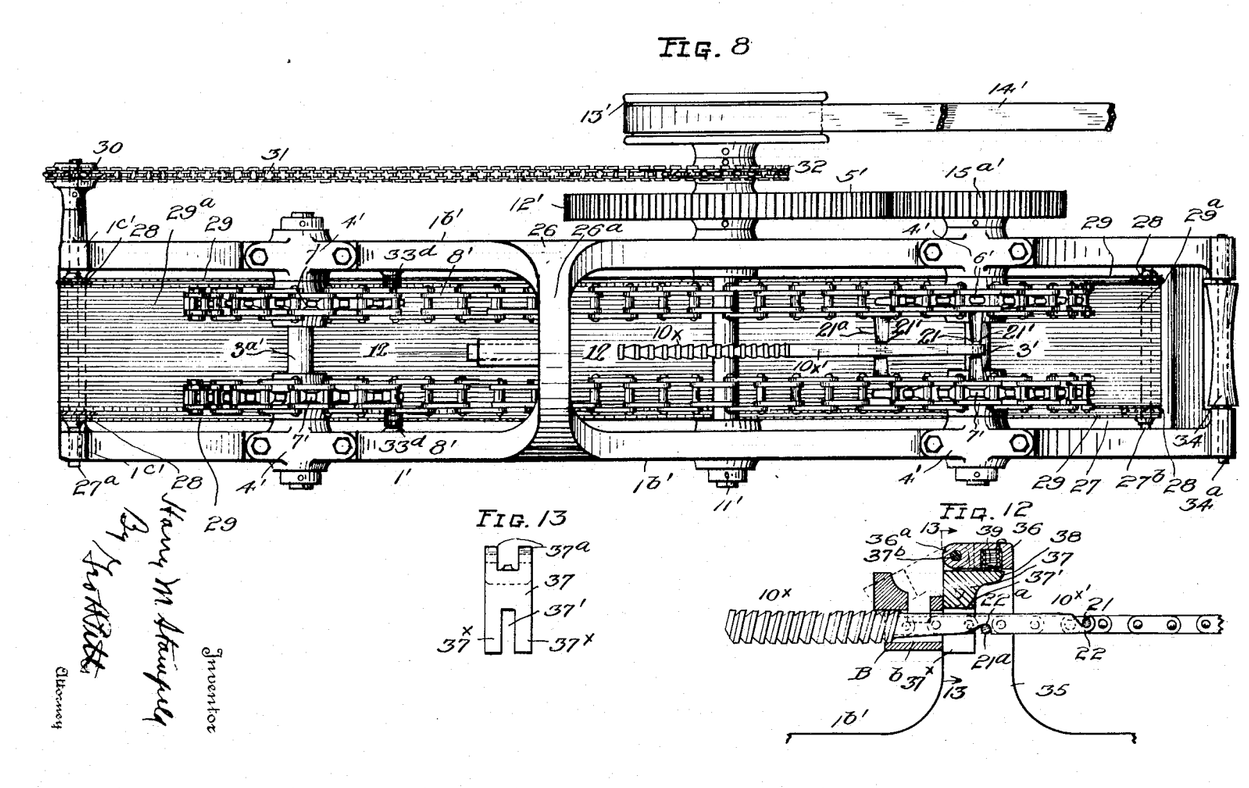
Fig. 8 is a plan view of a broaching machine of a different form of construction but embodying my invention.
Fig. 12 is a fragmentary section on the line 12—12 of Fig. 8, but showing a slightly modified construction for the mounting of the blank to be broached.
Fig. 13 is a detail view of the blank mounting taken on the line 13—13 of Fig. 12.
Figure 9:
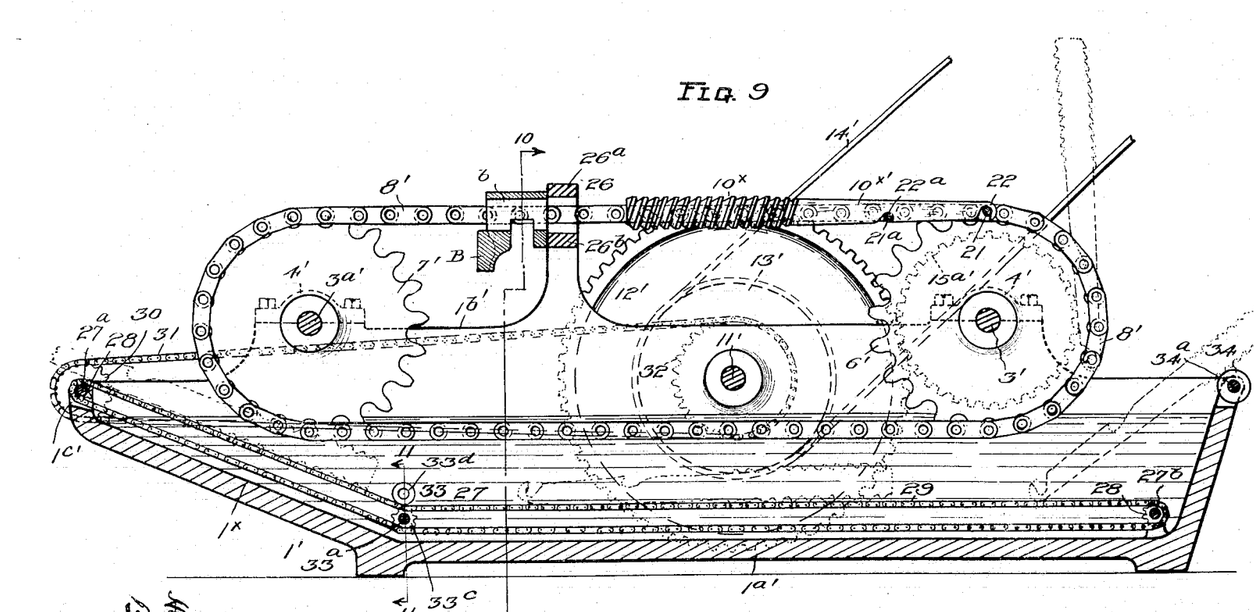
Fig. 9 is a longitudinal section of the machine shown in Fig. 8.
Figure 10:
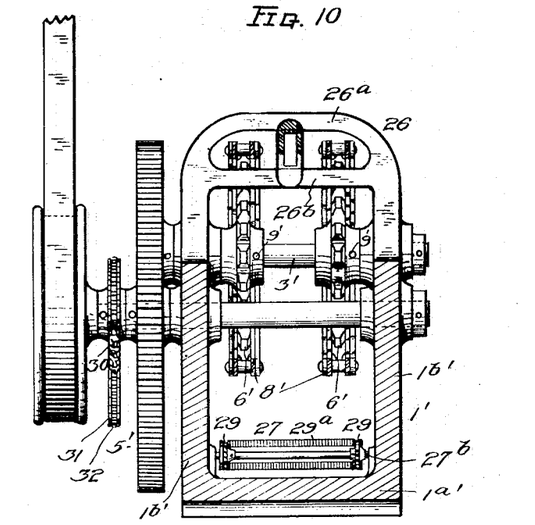
Fig. 10 is a section on the line 10—10 of Fig. 9.

Referring to Figs. 8 to 16, inclusive, I illustrate the application of my invention to the broaching of an opening b which extends through the blank B. In these views, 1' indicates as an entirety the support having a base 1a' and side members 1b'. In this form of construction I may shape and construct the support 1' so as to form a tank for the cutting compound. The side members 1b' support a pair of transverse shafts 3', 3a', disposed in spaced relation and mounted in suitable bearings 4', one of these shafts (3') being driven by a driving means indicated as an entirety at 5'. The shafts 3', 3a', have secured to them pairs of sprockets 6', 6', 7', 7', respectively, on and around which an endless carrier, such as a pair of endless chains 8' run in a well known manner. Each sprocket 6', 6', 7', 7', may be keyed to the adjacent shaft, and also adjustably secured thereto by suitable means, such as a set screw 9', fitting and extending through a threaded opening formed in the hub of the sprocket (see Fig. 10). In this form of construction, the blank B is mounted on a support, indicated as an entirety at 26 and the broaching tool, indicated as an entirety at 10x, is removably mounted on the chains 8' and is pulled thereby through the opening b in the blank B. The support 26 may comprise a pair of transverse bars or plates 26a, 26b, extending between and supported at their opposite ends by the side members 1b' or standards extending upwardly therefrom and spaced from each other a distance slightly greater than the vertical width of the opening b, so as to engage the upper and lower portions or walls of the blank B. As shown in Fig. 10 the transverse bars 26a, 26b, are disposed in planes above and below the plane of the run of the chains 8', so that the opening b to be broached may be arranged in the plane in which the tool 10x travels (see Fig. 9).

The driving means 5' preferably comprise a shaft 11' mounted in suitable bearings in the side members 1b' and carries on its extended end a gear 12' and a power element, such as a pulley 13' for a belt 14'. The gear 12' meshes with a pinion 15a' which is fixed to the shaft 3'.

The tool 10x comprises a body portion, on which the teeth are cut, and a shank 10x', which is detachably connected to the chains 8' in the manner to be later set forth. The cutting teeth extend entirely around the body portion, so as to effect broaching on all of the inner walls of the opening b. The teeth on the body portion are formed in a well known manner.

Figure 11:
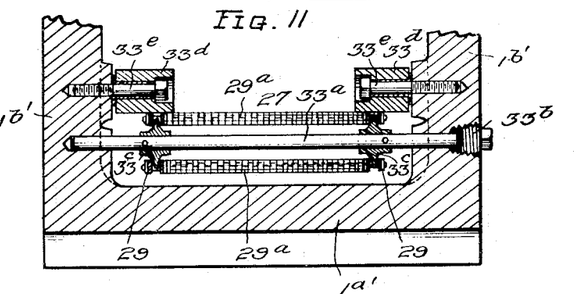
Fig. 11 is a section on the line 11—11 of Fig. 9.
Figure 14:
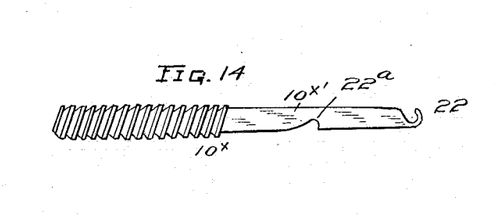
Fig. 14 is a side elevation of the broaching tool used in the form of construction shown in Figs. 8 to 13, inclusive.
Figure 15:
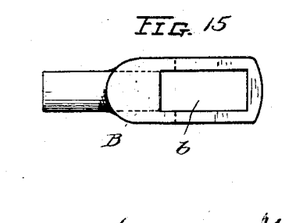
Fig. 15 is an end view and Fig. 16 is a side view (parts of the latter being broken away) of a blank wherein the opening (the walls of which are to be broached) extends through it.
Figure 16:
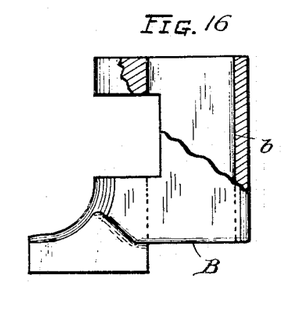

21b, 21a, indicate a pair of transverse members, each supported at its opposite ends by two aligned links of the chains 8', and arranged to engage the tool shank 10x', whereby the tool is pulled endwise through the opening b. The tool shank 10x' is interlocked with the transverse members by suitable devices which permit ready engagement with and disengagement from the members 21b, 21a, these devices preferably comprising a hook-like end 22b which engages the member 21b and the end wall of a notch 22a to receive the member 21a, the latter also serving, by its co-operation with the hook end 22b and member 21b, to support the tool in the plane of the chains and between them. In the form of construction shown in Figs. 8 and 9, the opening for the hook end 22b leads inwardly from the edge of the shank 10x', which arrangement permits the tool to release itself from the members 21b, 21a, and fall downwardly as it is carried by the chains 8' around the sprockets 6' (see dotted lines in Fig. 9). In Fig. 14 I have shown a modified form of construction in which the hook 22' is reversed, so that its opening leads inwardly from the upper edge of the tool shank 10x'. Either form of construction permits the tool shank 10x' to be readily connected to and detached from the supporting members 21b, 21a. Where the shank is construced as shown in Fig. 9, the hook end 22b is undercut sufficiently to prevent the tool from dropping downwardly between the chains due to the weight of its body portion. For the purpose of forming seats for the tool shank 10x' and insuring its positioning in a plane centrally between the chains, the transverse members 21, 21a, at the center portions are reduced for a distance equal to the thickness of the tool shank 10x', to form seats midway between the chains. As a result, the shoulders 21' formed by the reduced portions will operate to properly position the tool and hold it in such position as it is moved or pulled endwise by the chains 8'. As the shank seats are in alignment with each other, that is disposed in a plane parallel to the chains, the direction of movement of the tool 10x will be at right angles to the supporting bars 26a, 26b. This arrangement insures accurate broaching of the walls of an opening that extend longitudinally of the blank and at right angles to one end wall thereof, or that end wall which abuts the supporting bars 26a, 26b. In positioning the tool and connecting its shank 10x' to the transverse members 21b, 21a, the operative first threads a blank B on to the shank and moves it therealong to a point adjacent its body or teeth bearing portion; he then holds the tool until the transverse members move upwardly around the sprockets 7' and as the links carrying these members leave the sprockets, the operative manipulates the tool shank to effect engagement of the hook 22b and notch 22a with the members 21b, 21a, respectively. The operative may then retain hold of the tool or the blank or both to guide the blank into engagement with the supporting means 26. When the tool passes through the blank, the operative removes the blank, or it may be allowed to drop onto a chute (not shown) and discharged into a receiver. After broaching the blank opening b, the tool 10x may be manually detached from the carrier or it may be carried around the sprockets and caused to release itself. In either arrangement I prefer to provide a means, indicated as an entirety at 27, for passing the tools 10x through the cutting compound and returning them to the forward end of the support 1', where the operative can readily pick up each tool and position it on the carrier. Of the return means 27, 27a, 27b, indicate a pair of shafts, the former mounted in bearings provided in lugs 1c' on the front end wall of the support 1' and the other mounted on the bottom 1a' near the rear end wall of the support 1'. The shafts 27a, 27b, carry sprockets 28 for endless chains 29 between which is disposed an endless belt 29a of any suitable construction, the belt 29a being connected to the chains 29 so as to be supported and operated by them. The shaft 27a has an extension to which is secured a sprocket 30 for a chain 31 running around a sprocket 32 fixed to the shaft 11', whereby the belt 29a is driven. As shown in Fig. 9, the return conveyor 29a extends along the bottom 1a' to the front end thereof and then up the front wall 1x of the support 1', this wall being inclined for this purpose and its upper end being spaced from the sprockets 7' to provide a relatively wide delivery opening. 33 indicates suitable guide devices for the chains 29 and belt 29a at the front end of the bottom 1a' so as to guide them upwardly along the inclined wall 1x. The guide devices comprise a shaft 33a loosely fitting in openings in the side members 1b' and held in position by a plug 33b screwed into the outer end of the opening in one wall, sprockets 33c being fixed to the shaft 33a and arranged to engage the upper and lower runs of the chains 29 and a pair of rollers 33d loosely mounted on stud shafts 33e extending inwardly from the inner faces of the side members 1b' and arranged to engage the upper run of the chains 29. As shown in Fig. 11, the shafts 33e comprise bolts threaded into openings formed in the side members, their heads being preferably countersunk in the ends of the rollers 33d and serving to hold them in position on the shafts. 34 indicates a device which co-operates with the carrier to effect the release or disconnection of the tools therefrom, whereby they drop on the apron or belt 29a. The device 34 comprises a transverse member disposed in spaced relation to the sprockets 6', so that the free end of the tool 10x as it moves with the carrier around the sprockets, will engage therewith, which engagement will cause the opposite end (the shank 10x') to swing downwardly and thus disengage the members 21, 21a, as shown in dotted lines in Fig. 9. The shank 10x' when disengaged from the carrier, will drop onto the belt 29a, which will draw the tool off of the device 34 and convey it to the front end of the support 1'. Where a return means is provided, I may use several tools 10x, so that additional blanks may be broached without waiting for the tool to return as would be the case if only one tool were used. To facilitate the delivery of the tools to the belt 29a, the device 34 may comprise a concave roller loosely mounted on a shaft 34a supported in lugs, provided on the end wall of the support 1'.

When the tool 10x is detached manually from the carrier, it may be dropped downwardly through the space between the end wall of the support 1' and the sprockets 6', where it will engage the belt 29a and be returned thereby.

In Figs. 12 and 13 I have shown a modified form of supporting means for the blank B arranged to engage the side edges of the blank instead of its upper and lower edges. In these views, 35 indicates standards mounted on the side members 1b' (only one being shown) and supporting a cross bar 36 having a knuckle 36a. 37 indicates a member having a pair of knuckles 37a straddling the knuckle 36a and connected thereto by a pin 37b, whereby the member is pivotally connected to the bar 36. The member 37, when in operative position, depends downwardly from the bar 36, it having a tail portion 38 to engage the lower side of the bar and hold it stationary. The lower portion of the member 37 is slotted, as shown at 37', to provide legs 37x which are engaged by the blank B at either side of its opening b. 39 indicates a coiled spring disposed between the tail portion 38 and the bar 36 and normally tending to swing the abutment member 37 to the position shown in dotted lines in Fig. 12, whereby it clears the transverse shank supporting members 21, 21a. In this form of construction, the abutment is allowed to occupy its normal position until the supporting members 21, 21a, have passed by it, then it is moved downwardly to its operative position and held therein until engaged by the blank as it and the tool are pulled forwardly by the carrier, the slot 37' in the member 37 permitting it to move to this position without interference with the tool shank 10x'.

Figure 2:
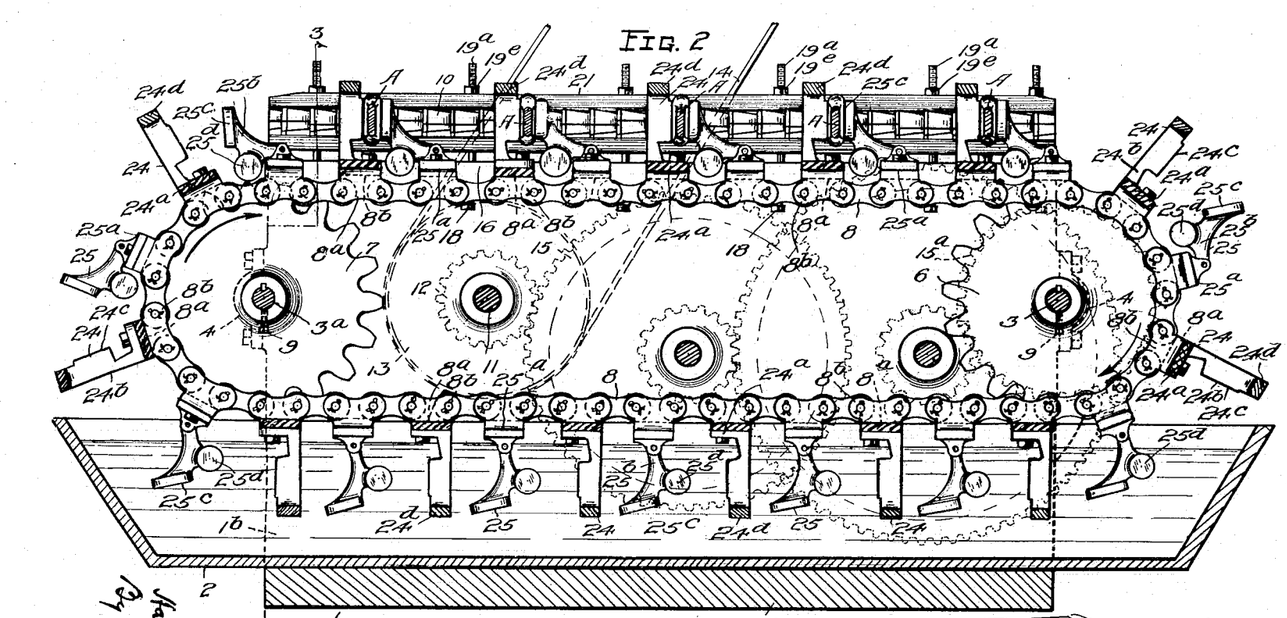
Fig. 2 is a section on the lines 2—2 of Figs. 1 and 3.
Figure 17:
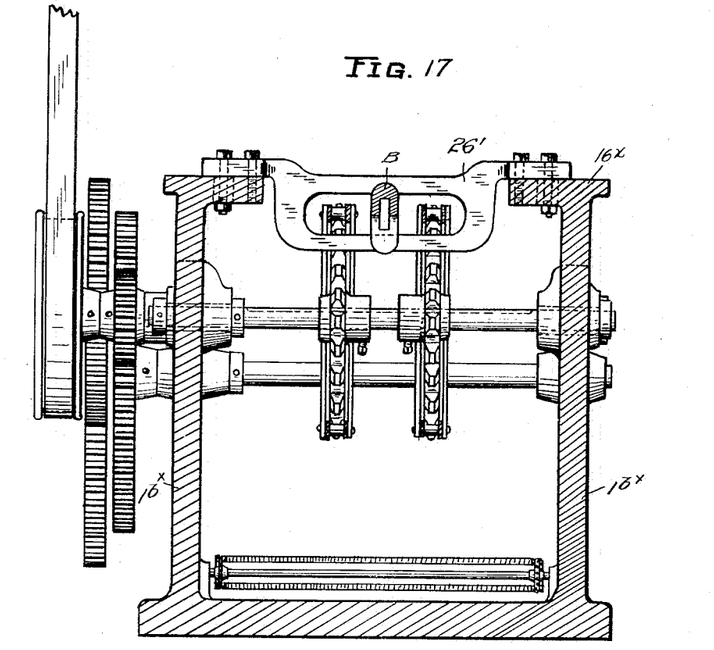
Fig. 17 is a transverse vertical section of a modified form of the invention and Fig. 18 is a fragmentary plan view thereof.
Figure 18:
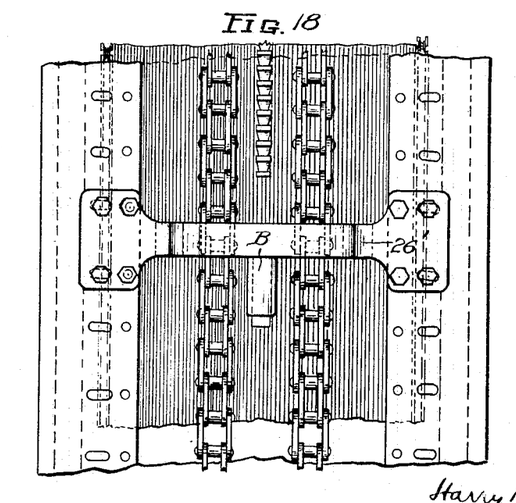

In Figs. 17 and 18 I have shown a form of construction similar to that illustrated in Figs. 9 and 10, except that the upper portions of the side member 1bx are similar to the side members 1b shown in Figs. 1, 2 and 3, whereby these side members may support tools 10, 10, secured in place by suitable devices such as already described or these parts removed and a support 26' secured to the bases 16x for engagement by the blank B, so that a tool 10x' may be connected to the chains and be pulled thereby to broach the opening in the blank. By reason of the fact that the sprockets are adjustable on their shafts in an endwise direction and the tool or blank engaging devices on the chains removed or the chains themselves removed, the machine may be readily adapted to either type of broaching operation.

To those skilled in the art to which my invention relates, many alterations and changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a support, an endless chain, sprockets on said support for said chain, a broaching tool, means for securing said tool to said support, a device on said chain arranged to engage a blank and move it relative to the tool, separate means on said support for guiding the blank relative to the tool, and means for driving one of said sprockets.

2. In apparatus of the class described, the combination of a support, a pair of chains, pairs of sprockets for said chains, broaching tools, means for securing said tools on said support in operative relation to the chains, guides for blanks on said support, devices on said chains for engaging the blanks and moving them relative to said tools, and means for driving one pair of said sprockets.

3. An apparatus as claimed in claim 2 in which each of the tool securing means is provided with a guide for the blank and a guide for its moving device.

4. In apparatus of the class described, the combination of a frame, a pair of endless chains mounted on said frame, a base on said frame and extending parallel to one run of the chains, a broaching tool mounted on said base and extending substantially from end to end thereof, said tool comprising separable pairs of upper and lower sections disposed in end to end relation, means for removably securing the tool to said base, a device on said chains for engaging a blank and moving it relative to said tool, means for maintaining the blank in fixed operative relation to the tool throughout its length, and means for driving said chains.

5. In apparatus of the class described, the combination of a support provided with a base, a pair of shafts mounted on said support in relation to the ends of said base, sprockets on said shafts, an endless chain on said sprockets and adapted to carry a blank, a relatively long sectional tool, a casing enclosing a portion of said tool, and means for vertically adjustably supporting and securing said casing on said base.

6. In apparatus of the class described, the combination of a support provided with a base, a pair of shafts mounted on said support in relation to the ends of said base, sprockets on said shafts, an endless chain on said sprockets and adapted to carry a blank, a relatively long sectional tool, a casing enclosing a portion of said tool, and means for vertically adjustably supporting and securing said casing on said base, said means permitting said casing to be adjusted on a longitudinal axis.

7. In apparatus of the class described, the combination of a support having a base; an endless chain and sprockets therefor mounted on said support and arranged to support one run of the chain in operative relation to said base, a relatively long sectional broaching tool, means for securing the tool to said base, said securing means being adjustable on said base and provided with a guide for the blank to maintain the latter in operative relation to the tool, means carried by said chain for holding and moving a blank relative to said tool, and means for driving one of said sprockets.

HARRY M. STAINFIELD.